C. H. PAEPLOW.
APPARATUS FOR USE IN MAKING BELTS OR THE LIKE.
APPLICATION FILED DEC. 10, 1920.

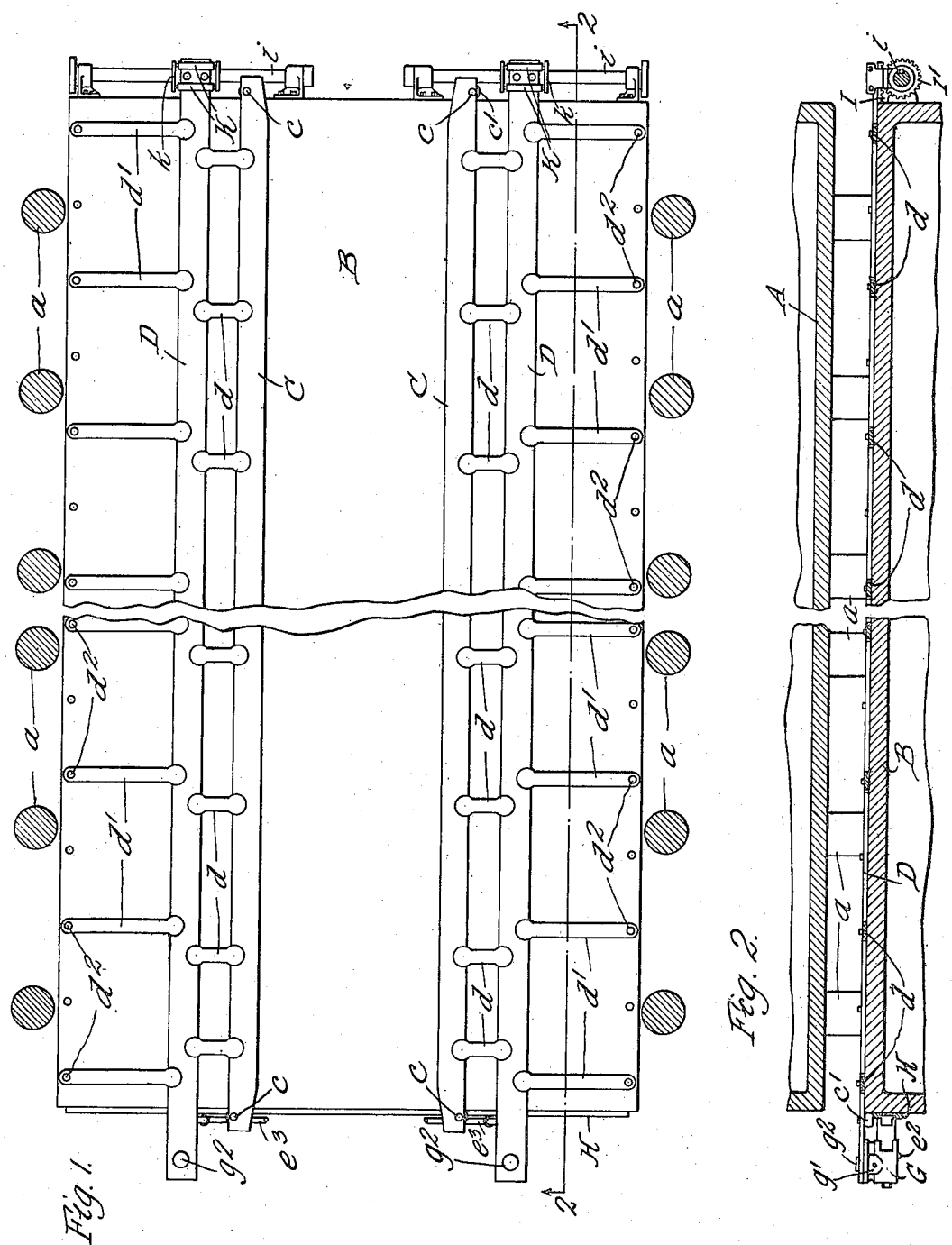

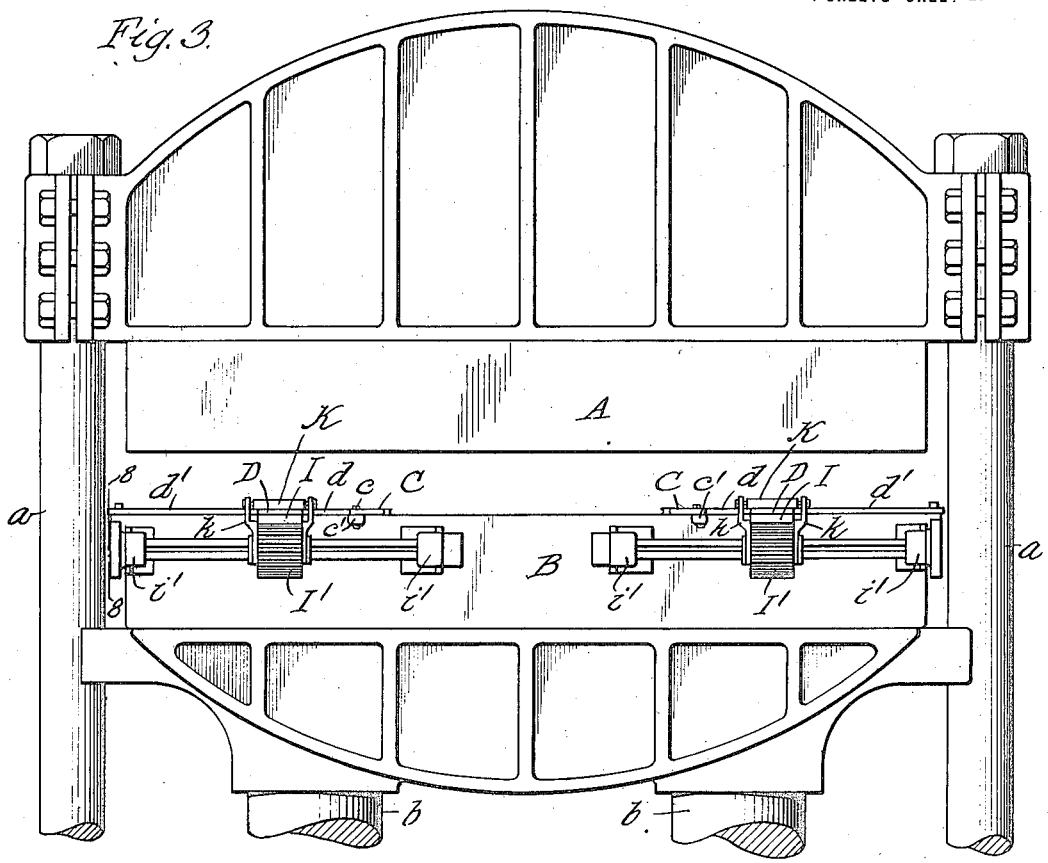

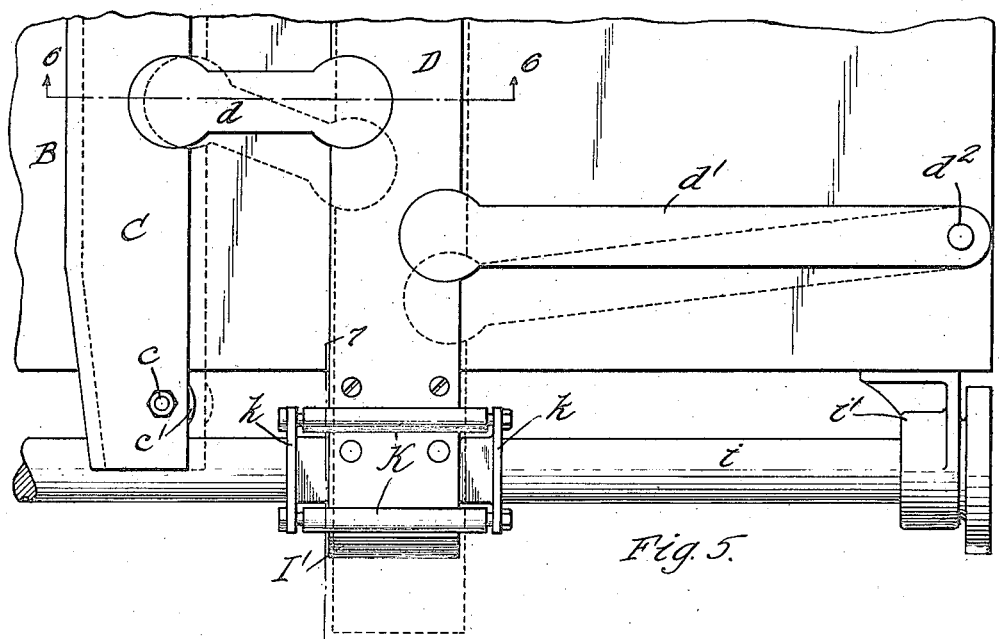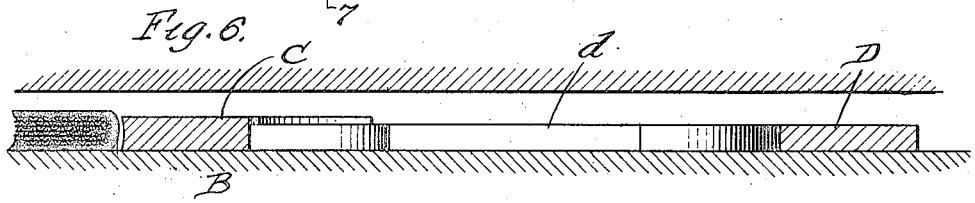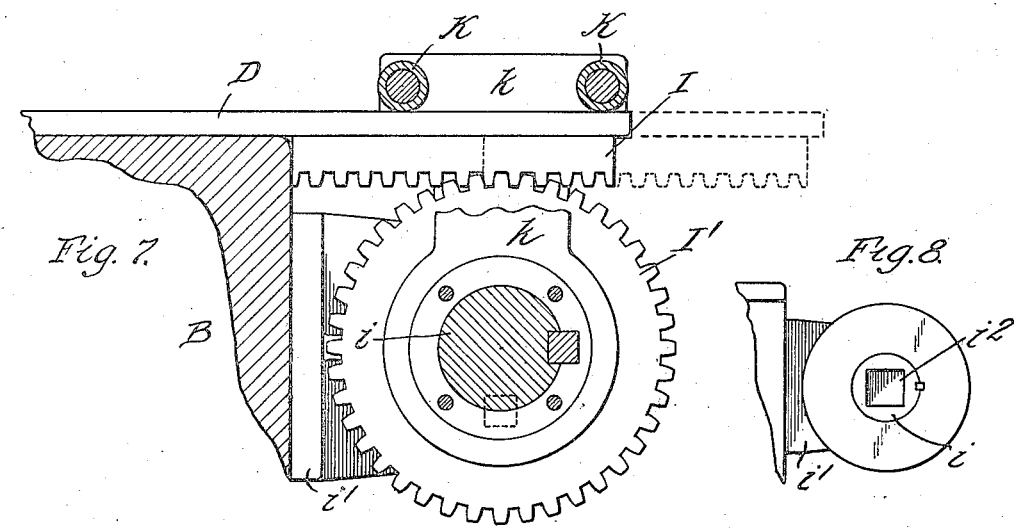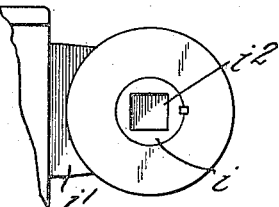

1,380,833.

Patented June 7, 1921.
4 SHEETS—SHEET 4.

INVENTOR.
Charles H. Paeplow
by Parker Prochurs,
ATTORNEYS.

UNITED STATES PATENT OFFICE.

CHARLES H. PAEPLOW, OF BUFFALO, NEW YORK.

APPARATUS FOR USE IN MAKING BELTS OR THE LIKE.

1,380,833.  Specification of Letters Patent.  Patented June 7, 1921.

Application filed December 10, 1920. Serial No. 429,774.

*To all whom it may concern:*

Be it known that I, CHARLES H. PAEPLOW, a citizen of the United States, residing at Buffalo, in the county of Erie and State of New York, have invented a new and useful Improvement in Apparatus for Use in Making Belts or the like, of which the following is a specification.

This invention relates to improvements in apparatus for use in connection with the manufacture of belting of the kind commonly referred to as rubber belting, and more particularly in connection with the vulcanizing of belting of this kind.

Apparatus of this kind generally consists of heated platens which are adapted to be pressed against the opposite faces of the belt for the purpose of curing or vulcanizing the same, one of the platens having bars or members adapted to confine the sides of the belt to hold the same against spreading. A length of belt to be cured is stretched after being fed to the apparatus which causes it to decrease in width. Consequently the side bars or members of the press must be moved toward and from the belt at each operation of the apparatus.

The objects of this invention are to provide apparatus of this kind with mechanism of improved construction for moving the side bars of the press toward and from the sides of the belt; also to provide power operated means for actuating the mechanism for moving the side bars; also to provide mechanism which will hold the side bars in their operative positions without the use of power; also to provide mechanism of this kind which can be readily adapted to operate on belts of different widths; and also to improve the construction of apparatus of this kind in other respects hereinafter specified.

In the accompanying drawings:

Figure 1 is a fragmentary sectional plan view of an apparatus embodying the invention, showing a top plan view of the lower platen.

Fig. 2 is a fragmentary longitudinal sectional elevation thereof on line 2—2, Fig. 1.

Fig. 3 is a fragmentary end elevation thereof on an enlarged scale.

Fig. 4 is a fragmentary end elevation of the opposite end of the apparatus.

Fig. 5 is a fragmentary top plan view of the lower platen, on an enlarged scale.

Fig. 6 is a transverse sectional elevation on a still larger scale on line 6—6, Fig. 5.

Fig. 7 is a longitudinal sectional elevation thereof on line 7—7, Fig. 5.

Fig. 8 is an end view of the operating shaft for actuating the side bars.

Figure 9:
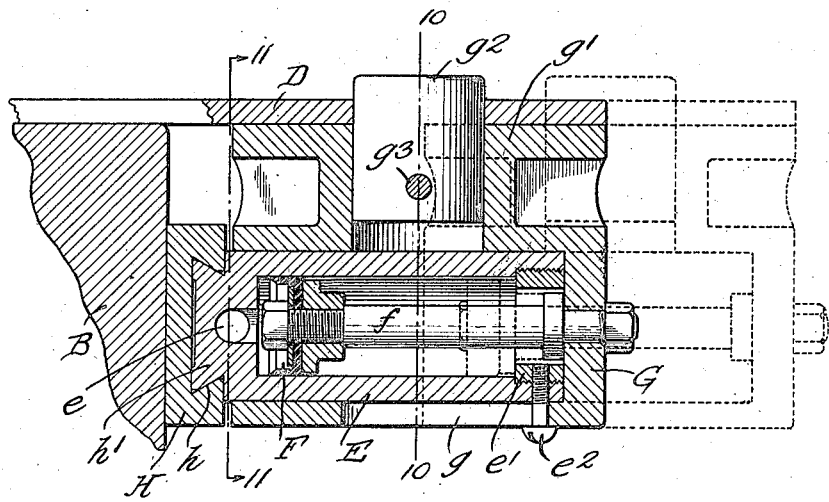
Fig. 9 is a sectional elevation thereof on line 9—9, Fig. 4.
Figure 10:
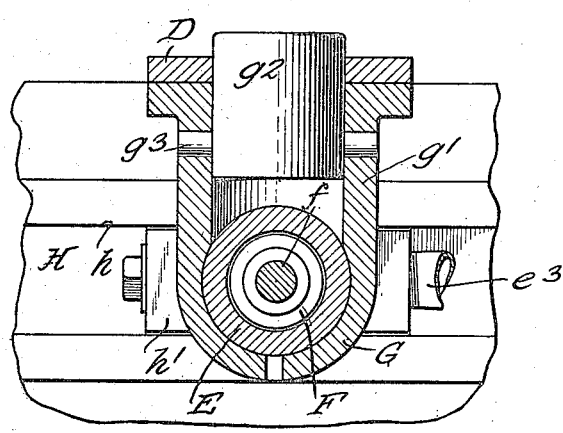
Figure 11:
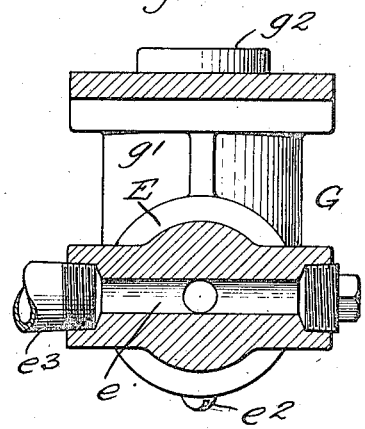

Figs. 10 and 11 are sectional elevations thereof on lines 10—10 and 11—11 respectively, Fig. 9.

A, Figs. 2 and 3, represents the upper platen or plate of the press, which in the particular construction shown is stationary and is secured to the base of the apparatus (not shown) by means of a plurality of upright pillars or posts $a$. B represents the lower platen or plate which is movable toward and from the upper platen by means of suitable mechanism (not shown) connected to the platen by means of plungers or the like $b$. Both the upper and lower platens are heated by any suitable means, the platens in the construction shown being hollow for the admission of steam or other heating medium. In using this press for curing or treating a belt, a length of belt is fed into the press and is stretched by any suitable stretching mechanism (not shown). After the portion of the belt between the platens A and B has been stretched, the lower platen B is moved toward the platen A and the belt is cured or treated while under pressure. After a portion of the belt has been treated, the belt is fed through the press until an untreated portion comes into operative relation with the platens, whereupon the operation is repeated. Presses of this kind have heretofore been used in connection with the manufacture of rubber belts and the press of itself constitutes no part of this invention.

When the belt is being treated under pressure, it is necessary to provide means engaging the sides of the belt to prevent the spreading of the same due to the pressure exerted on the belt, and for this purpose side bars C are provided which are adapted to engage the opposite side of the belt and prevent the spreading of the same. These side bars must be moved away from the sides of the portion of the belt which has been cured in order to permit the wider, unstretched and uncured portions of the belt to be fed to the press. After the uncured portion of the belt has been stretched the side bars must again be moved toward the edges of the belt. Consequently it is desirable to provide means whereby the side bars C can be easily and quickly moved toward and from the sides of the belt at each operation of the press. For this purpose the following construction is preferably employed:

The side bars C are guided in any suitable manner to move toward and from the sides of the belt, for example, the side bars may be provided with downwardly projecting pins or studs $c$ on which rollers $c'$ are pivoted, which are adapted to engage the ends of the lower platen to prevent lengthwise movement of the side bars. In order to move the side bars toward and from the belt, each of the side bars C is preferably connected by means of a plurality of substantially parallel links $d$ with a pivot bar D which is arranged to move approximately in the direction of its length to change the angularity of the parallel links with reference to the side pivot bars, and thus to move the side bars toward and from the belt. The pivot bar may be guided in its lengthwise movement in any suitable manner, for example the pivot bar may be pivotally connected with a plurality of substantially parallel links $d'$, which in the construction shown, extend from the pivot bar in a direction opposite to the links $d$. These links $d'$ are pivoted at their other ends at $d^2$ on the platen B. The two sets of links form with the pivot bar a toggle mechanism whereby the side bar C may be moved toward and from the belt and when the links extend substantially at right angles to the pivot bar D, no force is required to hold the side bar C in engagement with the side of the belt, since the links $d$ and $d'$ are in dead center positions. The links may be pivotally secured to the side bars in any desired manner, for example, the links may be formed with enlarged, substantially circular heads or end portions which are adapted to enter into recesses of corresponding shape in the bars C and D. By means of this arrangement the links and pivot bars may be made of the same thickness as the thinnest belt which is to be operated on by the press and the upper edges of all the links and bars lie in substantially the same plane. The side bars may be of the same thickness as the links and pivot bars or of greater thickness, depending upon the thickness of the belt to be treated. The pivots $d^2$ may be in the form of pins since these pivots are located beyond the edges of the upper platen so that the height of the pins $d^2$ does not interfere with the movement of the lower platen toward the upper platen. Any other pivotal connections between the links and bars may, of course, be used. By means of the construction shown it will be obvious that the side bars can be moved toward and from the edges of the belt by moving the pivot bars D lengthwise in either direction, causing the links and bars to move from the full line position shown in Fig. 5 to the dotted line position.

Means are preferably provided for moving the pivot bars D lengthwise of the apparatus to move the side bars toward and from the belts. Since considerable power may be necessary to move the side bars into engagement with the sides of the belt, power operated means are shown for moving the pivot bars in a direction to place the side bars into engagement with the belt and hand operated means are shown at the other end of the press to move the pivot bars in a direction for moving the side bars out of engagement with the belts. While this arrangement is preferably used, it will be obvious that either power operated means or hand operated means may be used at either end of the pivot bars.

The power operated means shown in detail in Figs. 4, 9, 10 and 11 include a cylinder with a piston movably arranged therein which is connected to the pivot bar D to actuate the same. E represents the cylinder having an inlet passage $e$ communicating with one end thereof for admission of the motive fluid, which may be of any suitable kind, water under pressure being preferably used. A piston F of any suitable construction is arranged in the cylinder E and is connected with a piston rod $f$ which connects with a reciprocating housing G which preferably surrounds the cylinder E for guiding the movement of the housing relatively to the cylinder. The end of the cylinder is provided with a sleeve or bushing $e'$ which limits the movement of the piston in the cylinder and which, in the construction shown, has a screw threaded engagement with the cylinder and is held against turning by means of a set screw $e^2$ extending through a slot $g$ in the housing G. The housing is preferably provided with an upwardly extending portion $g'$ having a stud or pivot $g^2$ secured thereon, for example by means of a retaining pin $g^3$. The stud $g^2$ extends through a hole in the pivot bar D. Consequently if water or other motive fluid under pressure is admitted through the passage $e$ to the cylinder E, the piston F, together with the housing G, moves outwardly into the position shown in dotted lines shown in Fig. 9, thus causing the pivot bar D to be moved into a position for placing the corresponding side bar into engagement with the belt. The passage $e$ may be connected by pipes or conduits $e^3$ with any suitable source of supply of motive fluid.

Since the ends of the links $d'$ connected to the pivot bar move about the pivots $d^2$, the pivot bar will have a limited movement sidewise of the platen, in addition to its lengthwise movement. Any suitable means may be provided for compensating for this movement of the pivot bar, that shown in the construction illustrated including a guide track H secured to the platen B and having an undercut or dove-tailed slot $h$ therein in which a corresponding shaped part $h'$ of the cylinder engages. Consequently the cylinder, together with the housing, may move lengthwise of the guide track H to compensate for the lateral movement of the pivot bar. Any other form of power operated means may be used to move the pivot bars in a direction to place the side bars into engagement with the belt.

Since the pivot bar cannot be made of greater thickness than the thickness of the thinnest belt to be treated on the machine, it is considered desirable to subject the pivot bars to tension only, since a push on the bar might tend to buckle the bar. For this reason the mechanism for moving the side bar toward the belt is arranged at one end of a pivot bar and the releasing mechanism is arranged at the opposite end thereof. The power necessary to release the belt is not very great, so that the releasing mechanism may be hand operated. As shown in Figs. 3, 5, 7, and 8 this mechanism is preferably constructed as follows:

Rack bars I are secured to the ends of the pivot bars D and are adapted to be engaged by means of gears I' splined to shafts $i$ suitably journaled in bearings $i'$ rigidly secured on one end of the lower platen B. The shafts $i$ are provided at their ends adjacent to the sides of the machine with sockets $i^2$ adapted to receive a crank or other suitable device (not shown) for turning the shaft. In order to hold the rack bar I in engagement with the gear I', a pair of rollers K is preferably provided which engage the upper face of the end of the pivot bar D. The rollers K are arranged on pins secured on brackets or projections $k$ which are provided at their lower ends with bearings or holes through which the hub of the gear I' extends. When one of the shafts $i$ is turned about its axis, the gear I' moves the rack bar and the pivot bar connected therewith from the full line to the dotted line position in Fig. 7, thus actuating the pivot bar to move the side bar C out of engagement with the belt. The lateral movement which the pivot bar receives owing to the fact that it is pivoted to the links $d'$, is compensated for by means of the splined connection of the gear with the shaft $i$, which enables the gear to move lengthwise of the shaft.

In the operation of the apparatus described, the belt after having been placed into the press and stretched, is confined against lateral displacement by means of the side bars C which are moved into engagement with the side edges of the belt by means of the hydraulically operated mechanism. This mechanism places the links $d$ and $d'$ into positions substantially at right angles to the side and pivot bars or in dead center positions, so that the side bars are positively held in engagement with the belt without depending upon the action of the hydraulic mechanism. After the belt has been cured, the pivot bar D is pulled in the opposite direction by means of the hand operated mechanism, thus releasing the side bar C from engagement with the belt.

The mechanism described very readily lends itself to adjustment to belts of different widths since the links $d$ and $d'$ can be easily removed from engagement with the side bars and pivot bars and replaced by longer or shorter links, depending upon the width of the belt to be treated, and the side bars may be varied according to the thickness of the belt to be treated. Owing to the fact that the hydraulic mechanism moves along the guide track H and the gear I' has a splined connection with the shaft $i$, the changing of the machine to operate on belts or strips of different widths is greatly facilitated. The actuation of the side bars by means of the mechanism described may be accomplished very rapidly so that practically no time is lost in moving the side bars into and out of engagement with the belt. Furthermore, the mechanism described eliminates the necessity of the operatives placing their hands between the hot platens for the purpose of shifting the side bars, as was necessary in machines as heretofore constructed.

I claim as my invention:—

1. In an apparatus for treating belting and the like, the combination of a platen adapted to receive the belt and to press the same against another platen, side bars movable toward and from the belt, and means engaging said side bars at intervals for moving the same toward and from the belt and for holding said side bars in operative relation to the belt.

2. In an apparatus for treating belting and the like, the combination of platens between which the belt may be compressed, side bars on one of said platens adapted to engage the sides of the belt, means for moving said side bars toward and from the belt, and means for holding said side bars in engagement with the sides of the belt.

3. In an apparatus for treating belting and the like, the combination of platens between which the belt may be compressed, side bars on one of said platens adapted to engage the sides of the belt, and links pivotally connected with said side bars for moving said side bars toward and from the belt and for holding said side bars in operative relation to the belt when said links are arranged substantially at right angles to said side bars.

4. In an apparatus for treating belting and the like, the combination of platens between which the belt may be compressed, side bars on one of said platens adapted to engage the sides of the belt, and toggle mechanism for moving said side bars into and out of engagement with the belt.

5. In an apparatus for treating belting and the like, the combination of platens between which the belt may be compressed, side bars on one of said platens adapted to engage the sides of the belt, a plurality of sets of toggle links pivotally connected with said side bars and with said platen, and a pivot bar connected with said toggle links for simultaneously actuating said toggle links.

6. In an apparatus for treating belting and the like, the combination of platens between which the belt may be compressed, a side bar on one of said platens movable toward and from a side of the belt, a pivot bar extending substantially parallel to said side bar, a set of links pivotally connecting said side bar and said pivot bar, and a second set of links pivotally connected to said pivot bar and to said platen, whereby lengthwise movement of said pivot bar will produce a lateral movement of said side bar.

7. In an apparatus for treating belting and the like, the combination of platens between which the belt may be compressed, a side bar on one of said platens movable toward and from a side of the belt, a pivot bar extending substantially parallel to said side bar and movable approximately in the direction of the length of said pivot bar, and a plurality of substantially parallel links connecting said pivot and side bars, whereby the lengthwise movement of said pivot bar produces a transverse movement of said side bar.

8. In an apparatus for treating belting and the like, the combination of platens between which the belt may be compressed, side bars on one of said platens adapted to engage the sides of the belt, and links pivotally connected with said side bars for moving said side bars toward and from the belt and for holding said side bars in operative relation to the belt when said links are arranged substantially at right angles to said side bars, said links having enlarged end portions extending into recesses formed in said side bars.

9. In an apparatus for treating belting and the like, the combination of platens between which the belt may be compressed, side bars on one of said platens adapted to engage the side of the belt, a plurality of sets of toggle links pivotally connected with said side bars and with said platen, and a pivot bar connected with said toggle links for simultaneously actuating said toggle links, said links having enlarged end portions engaging in recesses formed in said side and pivot bars.

10. In an apparatus for treating belting and the like, the combination of platens between which the belt may be compressed, a side bar on one of said platens adapted to be moved into and out of engagement with the sides of the belt, links pivotally connected with said side bar for moving said side bar toward and from said belt, a pivot bar connected with said links for actuating the same, and means engaging the opposite ends of said pivot bar for moving the same to actuate said links.

11. In an apparatus for treating belting and the like, the combination of platens between which the belt may be compressed, a side bar on one of said platens adapted to be moved into and out of engagement with the sides of the belt, links pivotally connected with said side bar for moving said side bar toward and from said belt, a pivot bar connected with said links for actuating the same, and power operated means for actuating said pivot bar.

12. In an apparatus for treating belting and the like, the combination of platens between which the belt may be compressed, a side bar on one of said platens adapted to be moved into and out of engagement with the sides of the belt, a second bar for actuating said side bar, and hydraulic mechanism for actuating said second bar.

13. In an apparatus for treating belting and the like, the combination of platens between which the belt may be compressed, a side bar on one of said platens adapted to be moved into and out of engagement with the sides of the belt, a second bar movable lengthwise of said machine for actuating said side bar, hydraulic mechanism for moving said second bar in one direction, and hand operated mechanism for moving said second bar in the other direction.

14. In an apparatus for treating belting and the like, the combination of platens between which the belt may be compressed, side bars on one of said platens adapted to engage the sides of the belt, a plurality of sets of toggle links pivotally connected with said side bars and with said platen, a pivot bar connected with said toggle links for simultaneously actuating said toggle links, and mechanism movably mounted on said apparatus for pulling said pivot bar.

15. In an apparatus for treating belting and the like, the combination of platens between which the belt may be compressed, side bars on one of said platens adapted to engage the sides of the belt, a plurality of sets of toggle links pivotally connected with said side bars and with said platen, a pivot bar connected with said toggle links for simultaneously actuating said toggle links, a cylinder and piston for actuating said pivot bar, and a guide track extending transversely of said apparatus and on which said cylinder and piston may move while actuating said pivot bar.

16. In an apparatus for treating belting and the like, the combination of platens between which the belt may be compressed, a side bar on one of said platens adapted to be moved into and out of engagement with the sides of the belt, links pivotally connected with said side bar for moving said side bar toward and from said belt, a pivot bar connected with said links for actuating the same, a rack secured to one end of said pivot bar, and a gear engaging said rack for actuating said pivot bar.

17. In an apparatus for treating belting and the like, the combination of platens between which the belt may be compressed, side bars on one of said platens adapted to engage the sides of the belt, a plurality of sets of toggle links pivotally connected with said side bars and with said platen, a pivot bar connected with said toggle links for simultaneously actuating said toggle links, a rack secured to said pivot bar, a gear engaging said rack, means for holding said gear in operative relation to said rack, and a shaft to which said gear is splined and which enables said gear to move transversely of the apparatus while actuating said pivot bar.

Witness my hand this 9th day of December, 1920.

CHARLES H. PAEPLOW.